United States Patent
Ninomiya et al.

(10) Patent No.: US 6,620,083 B2
(45) Date of Patent: Sep. 16, 2003

(54) TOOL POT FOR TOOL MAGAZINE

(75) Inventors: Akimasa Ninomiya, Kariya (JP); Mamoru Kato, Chita-gun (JP); Fumio Suzuki, Hekinan (JP); Kenji Iida, Toyohasi (JP); Toshikazu Sakei, Kariya (JP); Yasuhito Ishihara, Kariya (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 25 days.

(21) Appl. No.: 09/810,182

(22) Filed: Mar. 19, 2001

(65) Prior Publication Data

US 2002/0035019 A1 Mar. 21, 2002

(30) Foreign Application Priority Data

Jun. 7, 2000 (JP) .................................. 2000-171130

(51) Int. Cl.$^7$ .............................................. B23Q 3/157
(52) U.S. Cl. ..................... 483/65; 483/59; 483/902; 211/70.6; 279/900; D15/140
(58) Field of Search ............... 483/65, 59, 58, 483/901, 902, 62, 60–61, 63–64, 66–68; 211/1.51, 1.52, 1.53, 1.54, 1.55, 1.56, 1.57, 70.6; 279/900, 9.1; D15/140

(56) References Cited

U.S. PATENT DOCUMENTS

| | | | |
|---|---|---|---|
| 3,822,790 A | | 7/1974 | Armour et al. |
| 4,121,332 A | * | 10/1978 | Corsi ........................... 483/46 |
| 4,858,980 A | * | 8/1989 | Dreisig et al. ................ 24/545 |
| 4,945,628 A | | 8/1990 | Novak |
| 5,095,783 A | | 3/1992 | Majima |
| 5,102,177 A | * | 4/1992 | Dreisig et al. ............... 483/902 |
| D348,274 S | * | 6/1994 | Hallbach et al. ............ D15/140 |
| 5,688,215 A | | 11/1997 | Mase et al. |
| 6,155,961 A | * | 12/2000 | Pollington et al. ............ 483/59 |

| | | | |
|---|---|---|---|
| 6,191,207 B1 | * | 2/2001 | Fujii et al. ................... 524/494 |

FOREIGN PATENT DOCUMENTS

| | | |
|---|---|---|
| EP | 0 355 271 | 2/1990 |
| GB | 2 149 696 | 6/1985 |
| GB | 2 329 139 | 3/1999 |
| JP | 4-35841 | 3/1992 |
| JP | 5-146931 | 6/1993 |
| JP | 9-248731 | 9/1997 |
| JP | 10-231421 A * | 9/1998 |
| JP | 11-71518 A * | 3/1999 |

OTHER PUBLICATIONS

Koelsch, James R., "Specify the Right Toolchanger", Jul. 1995, Manufacturing Engineering, vol. 115, Issue 1.*
Vasilash, Gary, S., "Cells in Cincinnati", Oct. 1995, Production, v. 107, n10.*
Vasilash, Gary S. "Anatomy of a Machining Center: A Case Study in 9 Sections", Mar. 1992, Production, v. 104, n. 3, pp. 36–48.*
Derwent Publications, AN 1998–525565, JP 10 231421, Sep. 2, 1998.

* cited by examiner

*Primary Examiner*—A. L. Wellington
*Assistant Examiner*—Erica E Cadugan
(74) *Attorney, Agent, or Firm*—Oblon, Spivak, McClelland, Maier & Neustadt, P.C.

(57) ABSTRACT

A tool pot used for a tool magazine of a machine tool to removably hold a tool is disclosed. A main body of the tool pot is constructed a cylindrical wall defining a holing aperture for holding the tool, end ribs formed at opposed ends of the cylindrical wall and a plurality of longitudinal ribs formed between the end ribs on the outer periphery of the cylindrical wall. And the main body is integrally molded from a glass-fiber reinforced thermoplastic resin material such as crystalline nylon-type resin. Therefore, the tool pot has high wear resistance and light weight, and it can be recycled.

10 Claims, 7 Drawing Sheets

TOOL POT FOR TOOL MAGAZINE

INCORPORATION BY REFERENCE

The disclosure of Japanese Patent Application No. 2000-171130 filed on Jun. 7, 2000 is incorporated herein by reference in its entirety.

BACKGROUND OF THE INVENTION

1. Field of the Invention

The invention relates to a tool pot for a tool magazine for removably holding a plurality of tools.

2. Description of Related Art

In general, in a tool magazine for a machine tool such as a machining center, a plurality of tool pots are supported on an outer periphery of a magazine disc that is indexically rotated, and a tool is inserted into a holding aperture formed in each of the tool pots. A key protruding from an opening end face of the holding aperture then engages a key groove formed in the tool, and the tool is removably held in the tool pot while being stopped from rotation. A tool to be used next is unloaded from the magazine disc at a tool unloading position and swiveled by 90° to be parallel a rotational axis of the tool with a spindle of the machine tool. The tool held in the tool pot and a tool hold in the spindle are simultaneously exchanged by an automatic tool changer As shown in FIG. 1, a main body 5 of such a tool pot 1 has previously been molded from a phenolic resin. Because the phenolic resin is not great in impact strength, a metal key member 2 is fastened by means of a screw 3 to the outer peripheral face at an opening end of a holding aperture 4 formed in the main body 5, and a key portion 6 of the key member 2 protrudes outside of an opening end face 7 of the holding aperture 4.

In a case that the metal key member 2 is fastened to the tool pot 1 by the screw 3, the overall man-hour of assembling increases, and the head of the screw 3 causes wear to in a resinous guide plate for guiding the tool pot 1. The tool pot 1 is thick in a radial direction as a whole because of the necessity to increase rigidity. This makes it impossible to reduce its weight sufficiently. Also, because the phenolic resin is a thermosetting resin, the tool pot 1 cannot be recycled once it has become unusable due to wear.

SUMMARY OF THE INVENTION

The invention has been made to solve the problems stated above. It is an object of the invention to provide a tool pot that is lightweight and recyclable.

In order to solve the aforementioned problems, the invention provides a tool pot that is used for a tool magazine of a machine tool to attachablely hold a tool, wherein a holding aperture for holding the tool is formed in a main body of the tool pot. The main body of the tool pot is formed of a glass-fiber reinforced thermoplastic material composed of a thermoplastic resin containing a glass fiber.

Because the main body of the tool pot is formed of a glass-fiber reinforced thermoplastic material composed of a thermoplastic resin containing a glass fiber, it is possible to provide a tool pot that is lightweight and recyclable.

A tool pot according to another aspect of the invention comprises a main body having a holding aperture for holding a tool and a key that is disposed on an opening end face of the holding aperture and that engages a key groove formed in the tool to stop rotation of the tool. The main body and the key are integrally molded from a glass-fiber reinforced thermoplastic material composed of a thermoplastic resin containing a glass fiber.

Because the aforementioned construction eliminates the necessity to fasten the metal key member, it is possible to manufacture the key easily and at a low cost. Further, when the head of the screw for fastening the key member moves along the resinous guide plate for guiding the tool pot, no wear is caused.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENT

Figure 2:
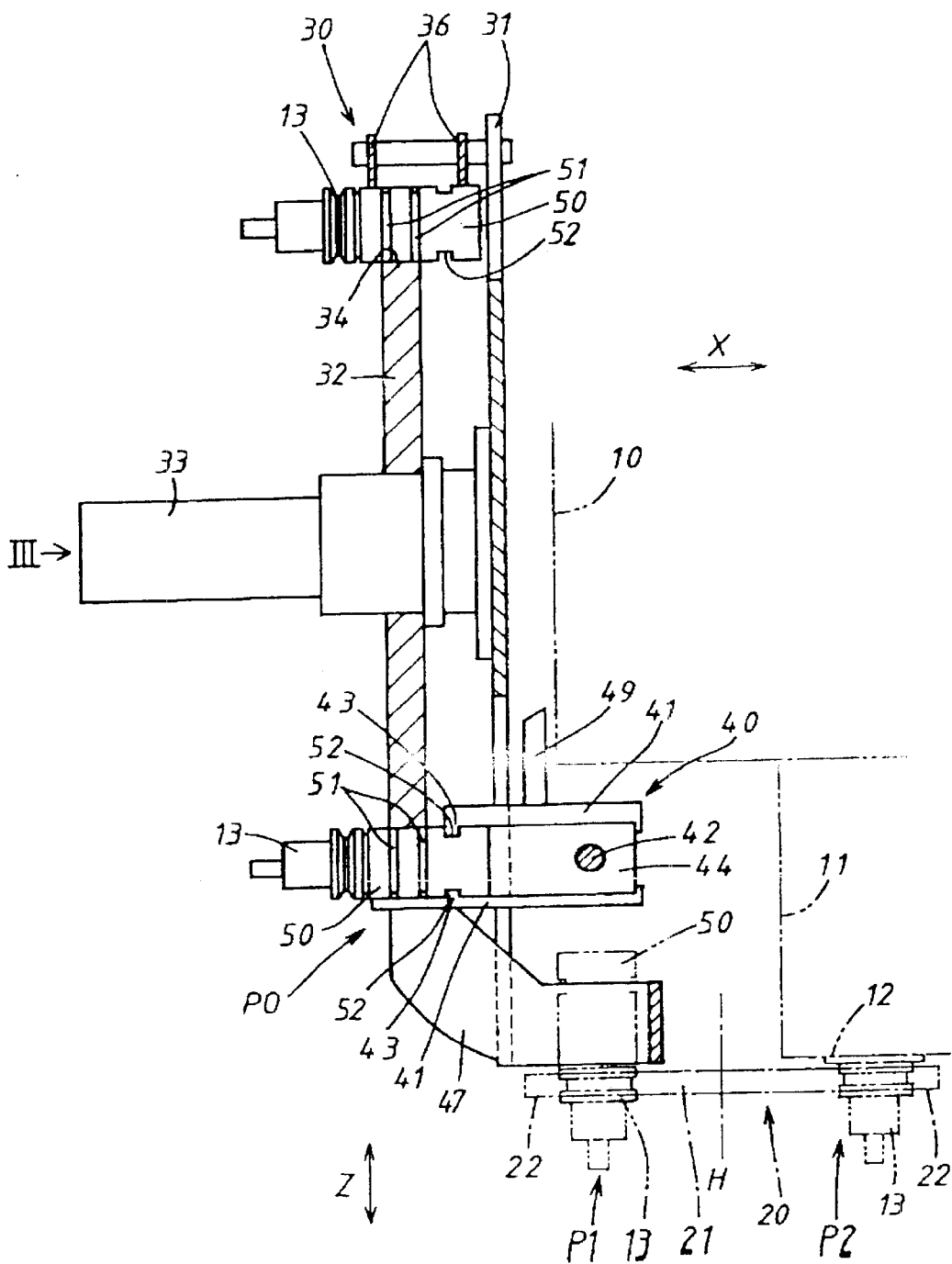
FIG. 2 is a cross-sectional view of a tool magazine attachment equipped with a tool pot according to the invention.
Figure 3:
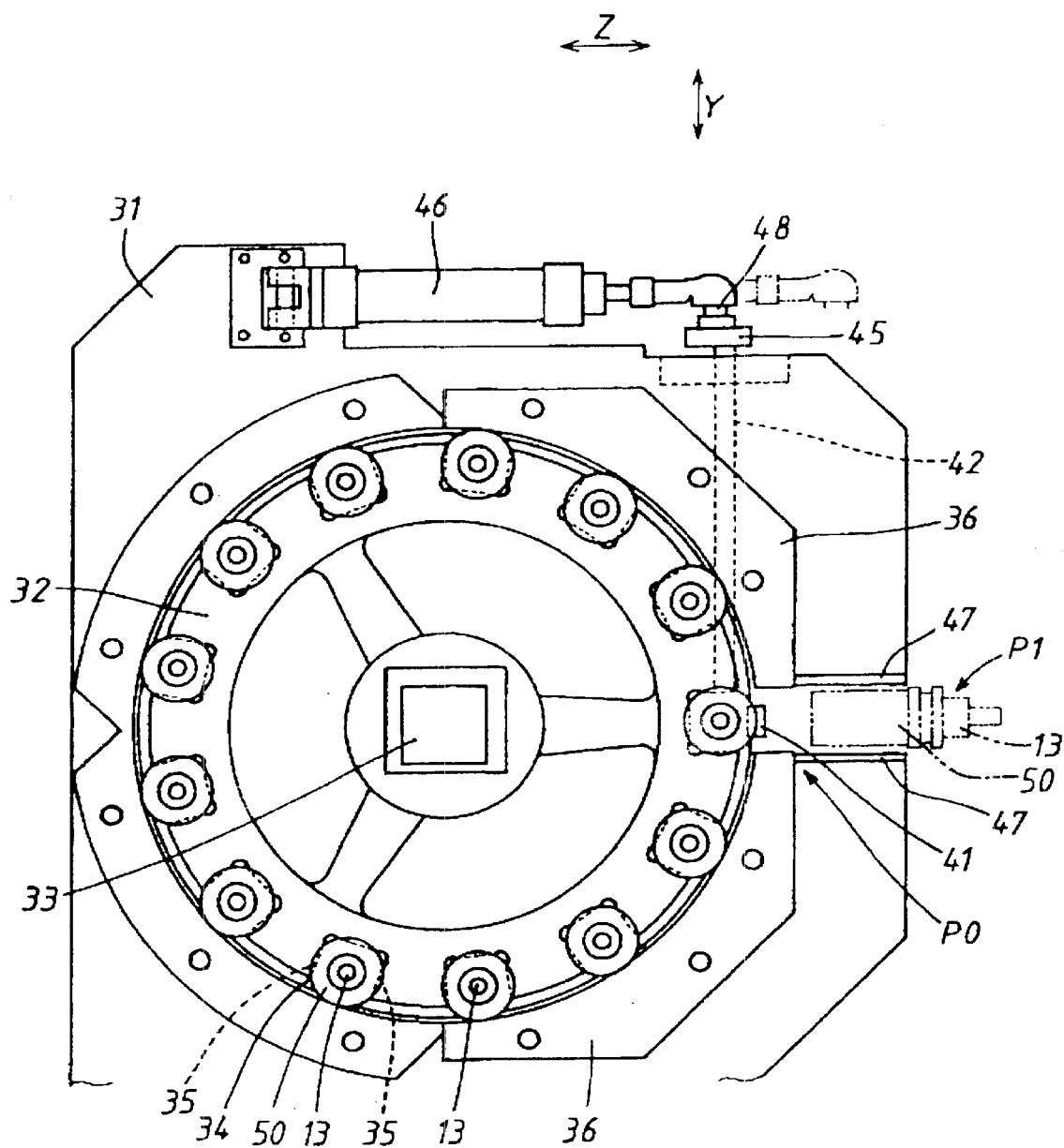
FIG. 3 is a side view seen from the direction of an arrow III in FIG. 2.

A tool magazine attachment equipped with a tool pot according to the invention will be described with reference to FIGS. 2, 3. In FIG. 2, a column 10 is guided and supported on a bed (not shown) such that the column 10 can slide in a direction of an X-axis by a servo motor (not shown). In exchanging tools, the column 10 is moved to a tool exchanging portion P2 shown in FIG. 2. A spindle head 11 is vertically slidably guided and supported on a front face of the column 10. The spindle head 11 is moved by a servo motor (not shown) in a vertical direction.

A spindle 12 is rotatably supported by the spindle head 11 around an axis parallel to the Z-axis and rotationally driven by a spindle motor (not shown). A tool 13 is removably fitted to a tip of the spindle 12. The tool 13 is constructed of a tool holder to which a cutting tool such as a drill is fitted. An automatic tool changer (hereinafter "ATC") 20 is installed on the bed between the column 10 positioned at the tool exchanging position P2 and a later-described tool magazine 30. The ATC 20 is composed of a tool exchanging arm 21 and a drive unit (not shown). The tool exchanging arm 21 has at its opposed ends grips 22 for gripping the tool 13, and can rotate around an axis H parallel to the spindle 12 and move along the axis H. The drive unit has a cam mechanism that rotates the tool exchanging arm 21 in normal and reverse directions by a predetermined angle and moves it forwards and backwards by a predetermined distance.

A magazine disc 32, that serves as an indexing rotor of the magazine, is supported on a stationary base 31 disposed in a standing manner on the bed, such that the magazine disc 32 is capable of indexical rotation around a horizontal axis parallel to the X-axis. The magazine disc 32 is indexically rotated by an indexing motor 33. A plurality of rectangular pot containers 34 are provided at equal intervals along the circumference of the magazine disc 32. Each of engaging grooves 51 formed in a tool pot 50 radially removably engage an engaging portion 35 protruding from the inside of the pot container 34.

A stationary guide rail 36 is so attached to the stationary base 31 as to surround the pot containers 34 of the magazine disc 32. The guide rail 36 prevents the tool pot 50 from moving away from the relevant pot container 34. The guide rail 36 and the stationary base 31 are notched at a tool unloading position P0, so that the tool pot 50 can be unloaded from the magazine disc 32.

The stationary base 31 is provided with a pot transfer unit 40 for transferring the tool pot 50 from the tool unloading position P0 to the tool exchanging position P1. A rotational shaft 42 is supported by the stationary base 31 through a bracket such that the rotational shaft 42 can rotate around the vertical axis. A pair of hooks 41 disposed in coordination with the notch in the guide rail. 36 (the tool unloading position P0) are fixed by a root 44. The hooks 41 have guides 43 that engage hook engaging grooves 52 formed in the tool pot 50 so as to sandwich from opposed sides the tool pot 50 that passes the tool unloading position P0 as the magazine disc 32 rotates. A rotational plate 45 is securely fitted to the upper end of the rotational shaft 42. The tip of a piston rod of a hook swiveling cylinder 46 is swingingly supported by the rotational plate 45 through a pin 48. The hook swiveling cylinder 46 is supported at one end by the stationary base 31 such that the hook swiveling cylinder 46 can rotate around an axis parallel to the Y-axis. The hooks 41 are swiveled by 90° together with the rotational shaft 42 due to the operation of the hook swiveling cylinder 46. The tool pot 50 is guided and supported by a pair of upper and lower guide plates 47 disposed in the notch of the guide rail 36 when it is transferred from the tool unloading position P0 to the tool exchanging position P1. A guide 49 secured to the hooks 41 is aligned with the notch in the guide rail 36 when the hooks 41 are swiveled to the tool exchanging position P1. The guide 49 prevents the tool pot 50 from moving away from the relevant pot container 34 when the magazine disc 32 is indexically rotated.

Figure 4:
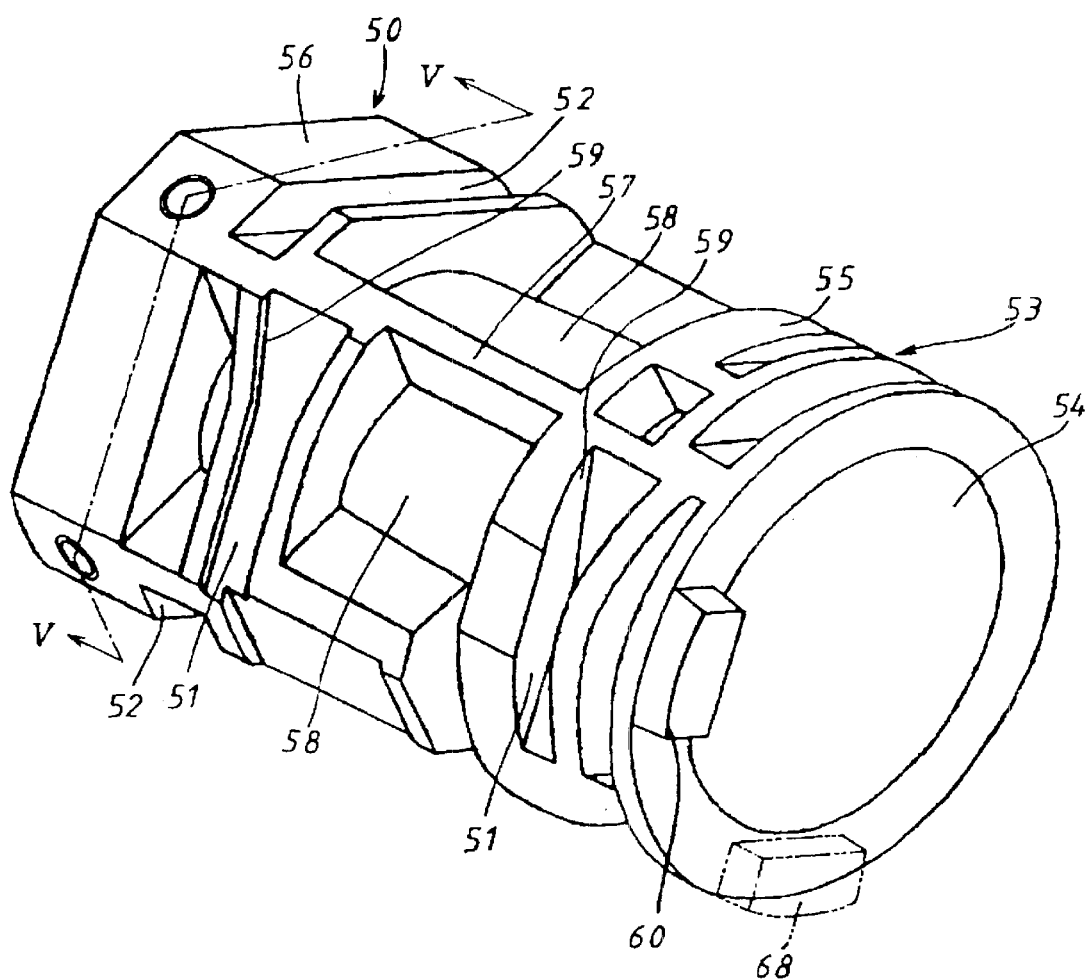
FIG. 4 is a perspective view of a tool pot according to the invention.

The tool pot 50 of the tool magazine 30 according to the invention will be described in further detail with reference to FIG. 4. A main body 53 of the tool pot 50 is integrally molded from a glass-fiber reinforced thermoplastic resin material. A main body 53 is constructed with a cylindrical wall 58, two end ribs 55, 56 and four longitudinal ribs 57. The cylindrical wall 58 provides a taped aperture 54 for holding the tool 13 in the center portion. The end rib 55 is an annular shape and formed at the front end of the cylindrical wall 58. The end rib 56 is a shape of generally square cross-section and formed at the rear end of a main body 53. The longitudinal ribs 57 are so formed as to connect the ribs 55, 56 with each other. The engaging grooves 51 are formed in the ribs 55, 56 on each lateral face of the main body 53. The engaging portion 35 protruding from the inside of each of the pot containers 34 removably engages the engaging grooves 51. A taper 59 is formed at the end of each of the engaging grooves 51 on the side of the magazine disc 32 with a view to facilitating engagement with the engaging portion 35 and disengagement therefrom. The hook engaging grooves 52 are formed in the other opposed faces of the rib 56 at the rear end of the main body 53. The hook engaging grooves 52 extend in a direction perpendicular to the axis of the holding aperture 54, and are engaged with the guides 43 of the hooks 41 and disengaged therefrom.

Figure 5:
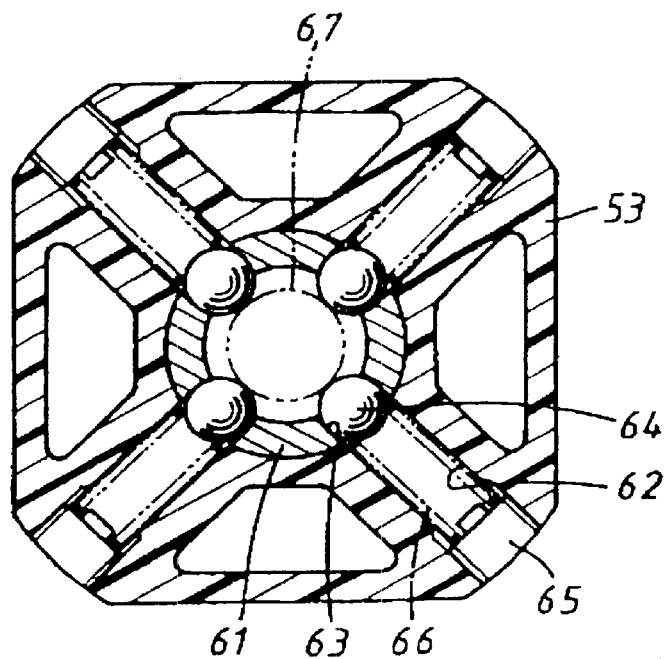
FIG. 5 is a cross-sectional view taken along a line V—V in FIG. 4.

A key 60 is integrally molded on the front end face of the main body 53 where the holding aperture 54 opens. The key 60 engages a key groove formed in the tool 13 and stops rotation of the tool 13 that has been inserted into the holding aperture 54 and held by the tool pot 50. In the rib 56 at the rear end of the main body 53, a metal ring 61 is fused to a rear-end small-diameter portion of the holding aperture 54 as shown in FIG. 5. Four detent holes 62 are formed in the outer peripheral face of the rib 56 so as to radially extend towards the ring 61. The detent holes 62 communicate with four ball support holes 63 formed in the ring 61 respectively. A ball 64 is loosely fitted in each of the ball support holes 63. A compression spring 66 is interposed between the ball 64 and a shrouding member 65 screwed into the detent hole 62. The ball 64 is urged inwards by the compression spring 66, partially protrudes to the radially inner side of the ring 61, removably engages a pull stud 67 of the tool 13 that has been inserted into the holding aperture 54, and hence prevents the tool 13 from falling off.

Figure 6:
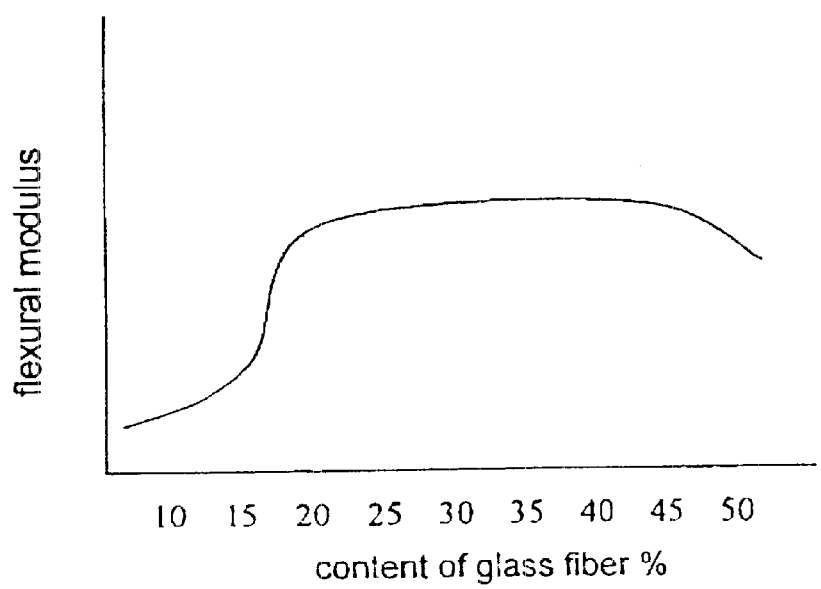
FIG. 6 is a graph showing a relation between contents of a glass fiber and flexural modulus of a glass-fiber reinforced thermoplastic material.

The main body 53 is integrally molded through the injection molding of a glass-fiber reinforced thermoplastic resin material. It is almost unnecessary to machine the main body 53 except the detent holes 62 at the rear end and threaded grooves into which the shrouding members 65 are screwed. The glass-fiber reinforced thermoplastic resin material used herein contains 30 weight percent of a glass fiber having a length of 200 $\mu$m to 300 $\mu$m and a diameter of 10 $\mu$m to 15 $\mu$m in N66 (polyamide 66), which is a nylon-type resin. Dies are maintained in a temperature range of 80° C. to 120° C. during the injection molding, whereby it becomes possible to enhance the modulus of elasticity and the tensile strength by 8 percent. The tool pot 50 thus molded is about four times as great in tensile strength and about ten times as great in impact strength as the prior-art tool pot molded from a phenolic resin. As shown in FIG. 6, the flexural modulus of the glass-fiber reinforced thermoplastic resin material rises from a point where the content of the glass fiber is about 15 percent, but falls after the content of the glass fiber exceeds 45 percent. This is because glass fibers interfere with one another and eventually break at the content exceeding 45 percent.

Figure 7:
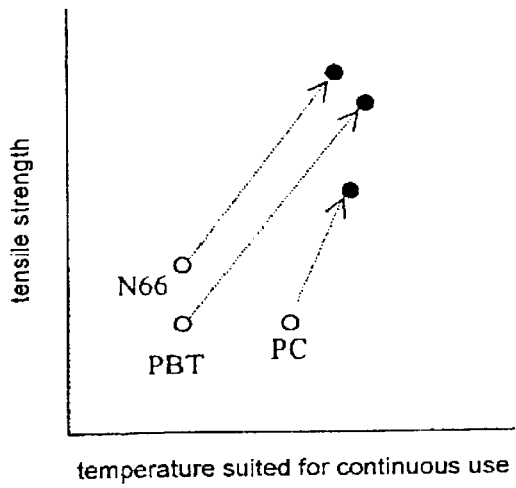
FIG. 7 is a graph showing a relation between temperature suited for continuous use and tensile strength of a crystalline resin and an amorphous resin.

It is also possible to employ N6 (polyamide 6), PET (polyethylene terephthalate), PBET (polybutylene terephthalate), PP (polypropylene), PC (polycarbonate), ABS (acrylonitrile-butadiene-styrene) and the like as a thermoplastic resin that contains a glass fiber so as to constitute the glass-fiber reinforced thermoplastic resin material. Glass-fiber reinforced thermoplastic resin materials containing crystalline resins such as N66, N6, PET, PBT and PP are more remarkable than those containing amorphous resins such as ABS and PC, for the effects associated with the inclusion of glass fibers, such as the increase of tensile strength and the enhancement of the temperature range suited for continuous use (In FIG. 7, white circles show tensile strength and the enhancement of the temperature range suited for continuous use of no inclusion glass fibers, and black circles show the same inclusion glass fibers). Therefore, the materials containing crystalline resin are better suited to mold the main body 53.

In the aforementioned embodiment, in order to exchange the tool 13 fitted to the spindle 12 and a tool 13 to be used next (hereinafter "next tool"), the column 10 is transferred to the tool exchanging position P2 shown in FIG. 2, and the tool pot 50 holding the next tool 13 is transferred by the pot transferring unit 40 from the tool unloading position P0 to the tool exchanging position P1. If the magazine disc 32 is indexically rotated with the pot transferring unit 40 at the tool unloading position P0, the tool pots 50 contained in the pot containers 34 are sequentially indexed at the tool unloading position P0 while being guided by the stationary guide rail 36, and proceed while being guided by the guides 43 of the hooks 41 located at the tool unloading position P0. If the tool pot 50 holding the next tool 13 is indexed at the tool unloading position P0, indexical rotation of the magazine disc 32 is stopped, and the hooks 41 are swiveled by 90° by the hook swiveling cylinder 46 As the hooks 41 are swiveled, the tool pot 50 is removed from the pot container 34 of the magazine disc 32 and swiveled while being guided by the guide plates 47. The tool exchanging arm 21 of the ATC 20 then rotates counterclockwise by a predetermined angle, and the grips 22 provided at the opposed ends of the arm hold the tool 13 fitted to the spindle 12 and the next tool 13 that has been transferred to the tool exchanging position P1. At this moment, each whirl-stop key 23 on the grips 22 engages one of the key grooves formed in each of the tools 13. The other key grooves formed in the tools 13 engage the key 60 of the tool pot 50 and the key 25 of the spindle 12 respectively (see FIG. 9). The tool exchanging arm 21 thereafter proceeds forwards, draws the tools 13 out of the tool fitting aperture at the tip of the spindle 12 and the holding aperture 54 of the tool pot 50, rotates by 180°, and retreats. Thus, the tools 13 are exchanged between the spindle 12 and the tool pot 50. In this case, when the key 60 of the tool pot 50 is engaged with and disengaged from the key grooves formed in the tools 13, the key 60 may partially impact against the key grooves. However, the key 60 is integrated with the main body 53 molded from the glass-fiber reinforced thermoplastic resin material, and is about ten times as great in impact strength as the phenolic resin. Therefore, the key 60 is unsusceptible to damages.

The magazine disc 32 is indexically rotated such that the pot container 34 containing the tool pat 50 for holding the tool 13 previously fitted to the spindle 12 is indexed at the tool unloading position P0. Upon completion of an exchange of tools by the MC 20, the column 10 is restored to a machining position. The tool pot 50 for holding the tool 13 previously fitted to the spindle 12 is then returned from the tool exchanging position P1 to the tool unloading position P0 to be contained in the pot container 34 corresponding to the tool 13.

Figure 8:
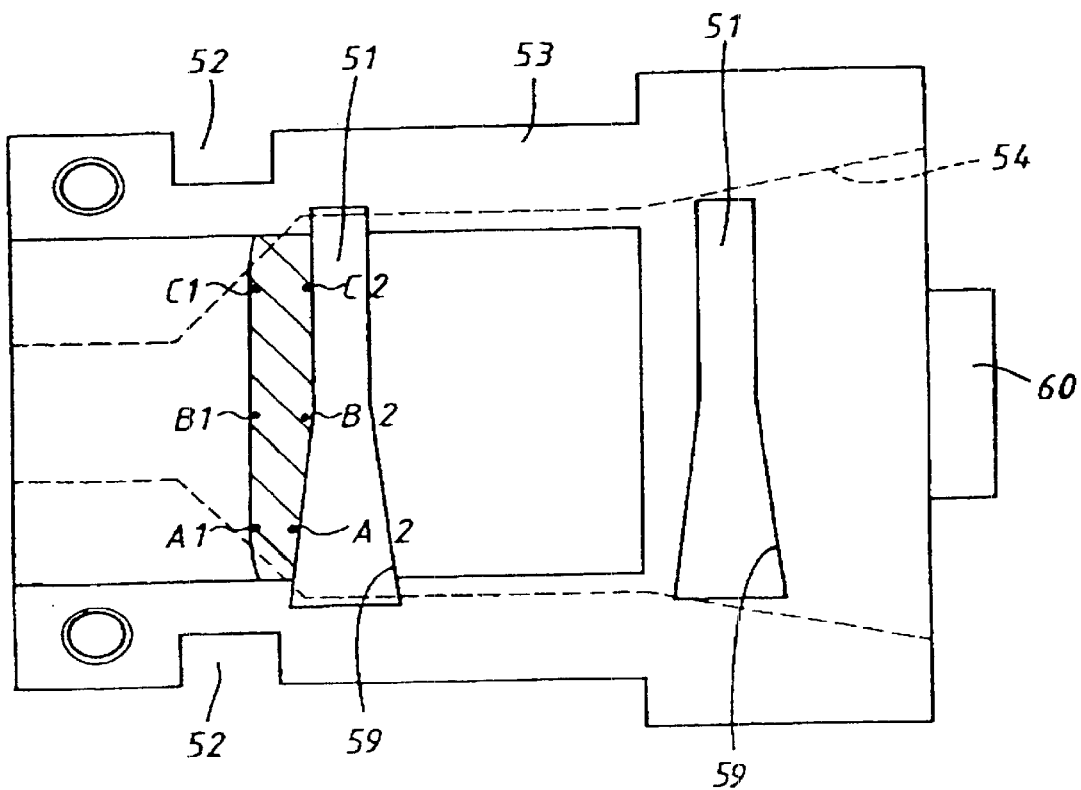
FIG. 8 is a side view of the tool pot showing locations of an engaging groove to be measured for degrees of wear.

As described above, since the tool pot 50 is transferred in a sliding manner, the tool pot 50 is ground against some portions which are the guide rail 36 of the tool magazine 30, the engaging portion 35 of the pot container 34, the guides 43 of hooks 41 and the guide plates 47. It is considered that amount of wear at sides portion of the engaging grooves 51 formed in the rib 56 at the rear end sliding to the engaging portion 35 is larger than other portions, because the tool pot 50 is turned in small radius during transferring from the tool unloading position P0 to the tool exchanging position P1. Thus, a repetitive wear test of the engaging groove 51 of the rib 56 has been conducted by loading the tool pot 50 into the pot container 34 and unloading it therefrom one hundred fifty thousand times. Because the main body 53 of the tool pot 50 according to the invention is molded from the glass-fiber reinforced thermoplastic resin material as mentioned above and demonstrates high wear resistance, the engaging groove 51 of the rib 56 is substantially reduced in the degree of wear at six locations (A1, A2, B1, B2, C1, C2) shown in FIG. 8 in comparison with the tool pot made of the phenolic resin, as is apparent from a table shown below.

Result of Repetitive Wear Test
(A tool weighing 15 kg is held, and loaded and unloaded one hundred fifty thousand times.)

unit: mm

| Locations to Be Measured for Wear | A1 | A2 | B1 | B2 | C1 | C2 |
|---|---|---|---|---|---|---|
| Tool Pot Main Body Made of Phenolic Resin | 0.2 | 0.6 | 0.2 | 0.3 | 0.2 | 0.2 |
| Tool Pot Body Made of Glass-Fiber Reinforced Nylon 66 (With the Content of 30%) | 0 | 0.01 | 0 | 0 | 0 | 0 |

Even if the tool pot 50 has become unusable because of an increased degree of wear, the main body 53, which is molded from a glass-fiber reinforced thermoplastic resin material composed of a thermoplastic resin containing a glass fiber, can be recycled. Furthermore, in the tool pot made of the phenolic resin, when the tool pot 50 is swiveled while being guided by the guide plate 47, the head of the screw for fastening the metal key member to the main body is ground against the surface of the guide plate 47 and causes wear. However, in the tool pot 50, since the key 60 is integrated with the main body 53, the sliding movements between the resin materials do not cause wear of the guide plate 47. In addition, the main body 53 is composed of the ribs 55, 56, the axial rib 57 and the thin cylindrical wall 58, and the tool 13 is held in the holding aperture 54 with the thin wall serving to absorb oscillation. Therefore, the tool 13 is prevented from falling off from the tool pot 50 during the indexical rotation of the magazine disc 32 and the transfer operation performed by the pot transfer unit 40. Because the main body 53 is shimmed down by being composed of the ribs and the thin wall, the required amount of the molding material is reduced. This makes the tool pot 50 lightweight and inexpensive and enhances the energy efficiency of rotating the tool magazine 30.

Figure 1:
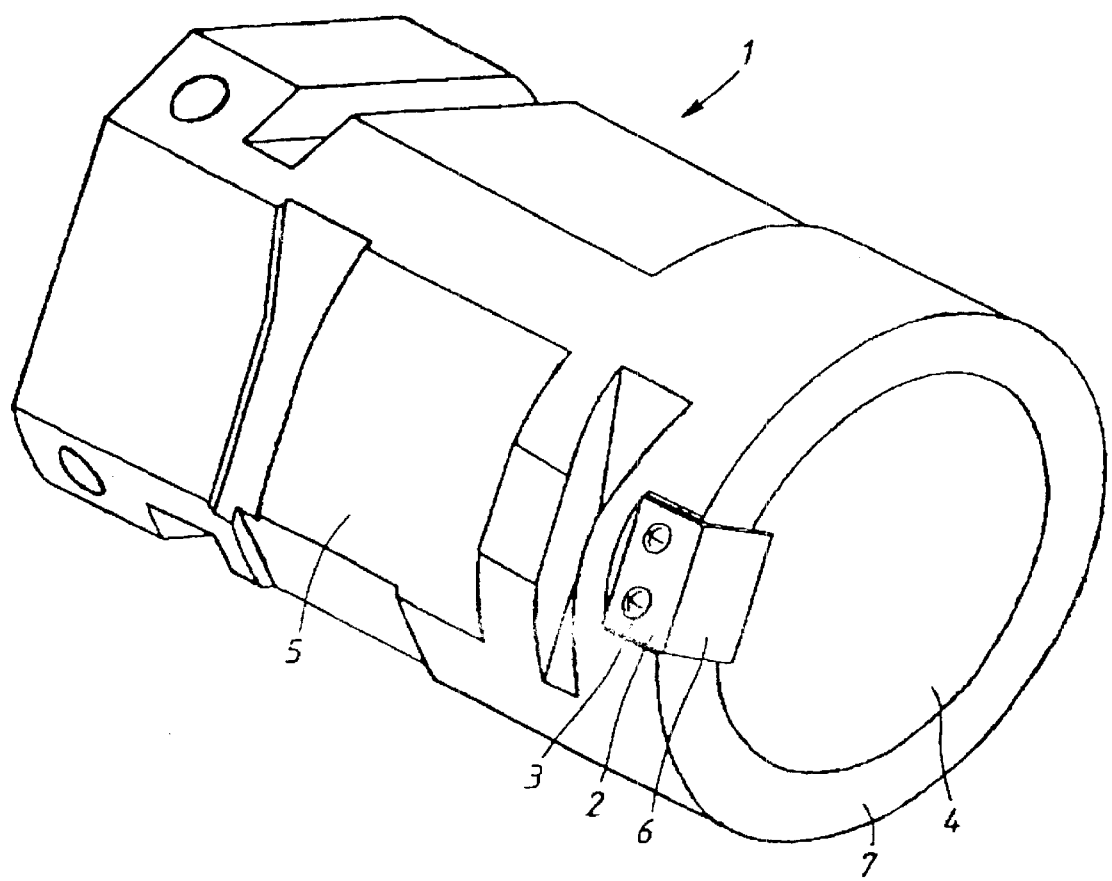
FIG. 1 is a perspective view of a tool pot made of a phenolic resin.
Figure 9:
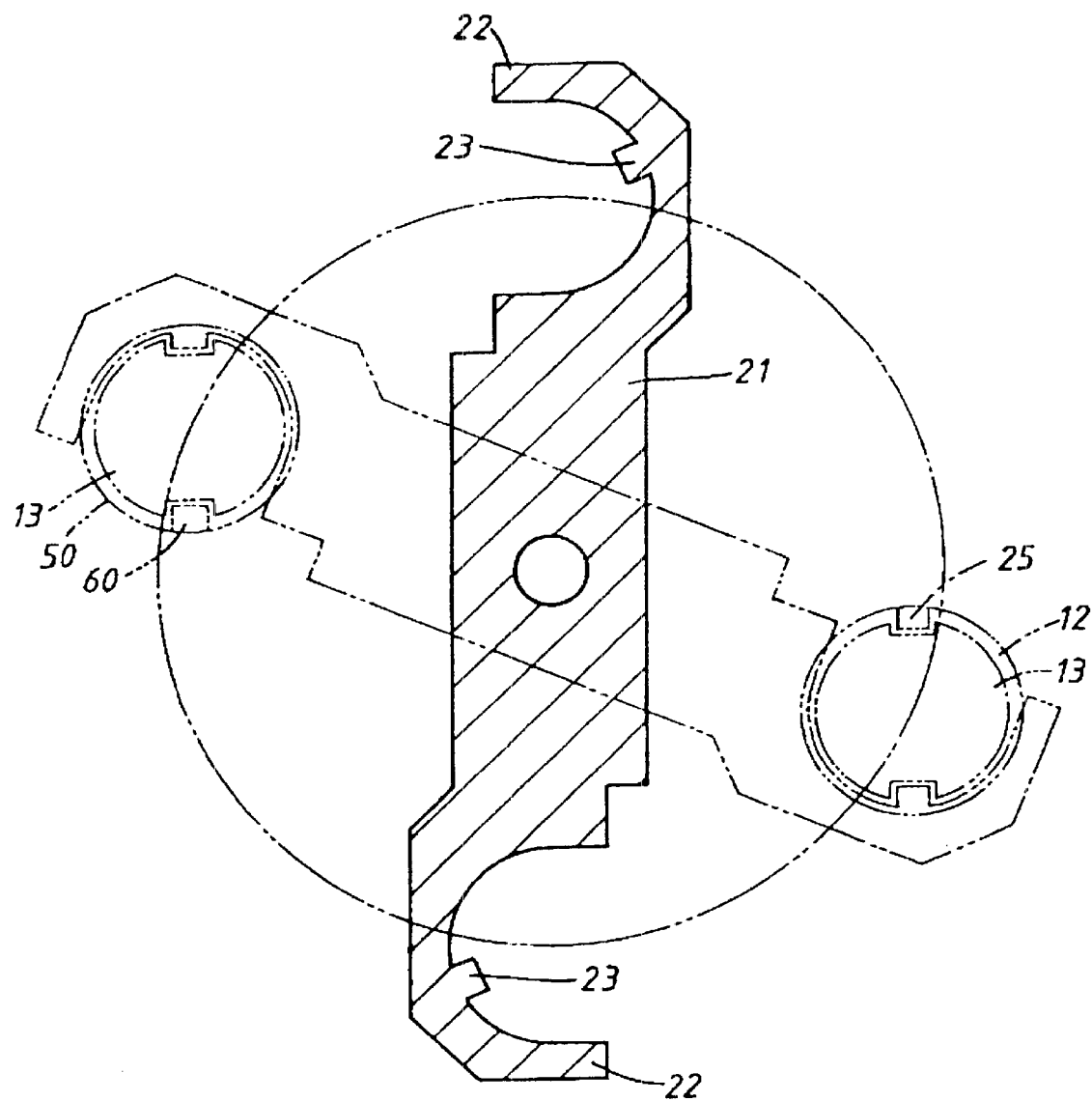
FIG. 9 is a cross-sectional view of a tool exchanging arm showing the operation thereof.

In the tool magazine 30 and the pot transfer unit 40 shown in FIGS. 1, 2, the spindle 12 is substantially as high as the tool pot 50 that has been transferred to the tool exchanging position P1 in the horizontal direction. In the tool magazine 30 and the pot transfer unit 40 of this type, if the tool exchanging arm 21 is rotated counterclockwise by a predetermined angle as shown in FIG. 9, a whirl-stop key 23 of the grip 22 engages from above one of the key grooves in the tool 13 held by the tool pot 50. Thus, the key 60 of the tool pot 50 engages the other key groove in the tool 13; below, whereby the tool 13 is positioned. However, in a tool magazine and a pot transfer unit of another type wherein the spindle 12 and the tool pot 50 that has been transferred to the tool exchanging position P1 are arranged in the vertical direction, if the tool exchanging arm 21 is rotated counterclockwise by a predetermined angle, the whirl-stop key 23 of the grip 22 laterally engages one of the key grooves formed in the tool 13 held by the tool pot 50. For this reason, a key 68 of the tool pot 50 needs to engage the other key groove of the tool 13 at the other lateral position. Accordingly, the key 68 of the tool pot 50 employed in such a tool magazine needs to be different in phase angle by about 90° from the key 60 of the tool pot 50 employed in the tool magazine 30 shown in FIGS. 1, 2. If the keys 60, 68 of the tool pots 50 are different only in phase angle and identical in other respects, a great number of main bodies 53 having the keys 60, 68 may be molded, and those keys which do not suit the tool magazine employing the tool pots 50 may be removed by being cut off.

What is claimed is:

1. A tool pot used for a tool magazine of a machine tool to removably hold a tool, comprising:

a main body including a cylindrical wall and a bottom surface adjacent the cylindrical wall defining a holding aperture for holding the tool, the main body formed of glass-fiber reinforced thermoplastic material composed of thermoplastic resin containing glass fibers, wherein the main body further comprises end ribs formed at opposed ends of the cylindrical wall, and a plurality of longitudinal ribs formed between the end ribs on the outer periphery of the cylindrical wall.

2. A tool pot according to claim 1, wherein the thermoplastic resin comprises a nylon resin.

3. A tool pot according to claim 1, wherein a content of the glass fiber ranges from 15 weight percent to 45 weight percent.

4. A tool pot according to claim 3, wherein the glass fiber ranges from 200 $\mu$m to 300 $\mu$m in length and from 10 $\mu$m to 15 $\mu$m in diameter.

5. A tool pot according to claim 1, wherein the tool pot is configured to be slidably mounted to and removed from the tool magazine.

6. A tool pot used for a tool magazine of a machine tool to removably hold a tool, comprising:

a main body including a cylindrical wall and a bottom surface adjacent the cylindrical wall defining a holding aperture for holding the tool; and a key disposed in an opening end face of the holding aperture and engaging a key groove formed in the tool to stop rotation thereof, wherein the main body and the key are integrally molded from glass-fiber reinforced thermoplastic material composed of thermoplastic resin containing glass fiber, wherein the main body further comprises end ribs formed at opposed ends of the cylindrical wall, and a plurality of longitudinal ribs formed between the end ribs on the outer periphery of the cylindrical wall.

7. A tool pot according to claim 6, wherein the thermoplastic resin comprises a nylon resin.

8. A tool pot according to claim 6, wherein a content of the glass fiber ranges from 15 weight percent to 45 weight percent.

9. A tool pot according to claim 8, wherein the glass fiber ranges from 200 $\mu$m to 300 $\mu$m in length and from 10 $\mu$m to 15 $\mu$m in diameter.

10. A tool pot according to claim 6, wherein the tool pot is configured to be slidably mounted to and removed from the tool magazine.

* * * * *